Patented Feb. 18, 1941

2,232,052

UNITED STATES PATENT OFFICE 2,232,052

PROCESS OF MANUFACTURING ALBUMIN-LIKE SUBSTANCE FROM PROTEIN RICH VEGETABLE MATERIAL

Earl H. Cummins, Chicago, Ill., assignor to The Curtiss Candy Company, Chicago, Ill., a corporation No Drawing. Application June 4, 1938,
Serial No. 211,845

18 Claims. (Cl. 195—29)

This invention relates to the process of preparing an albumin-like substance from vegetable matter, such as soya beans or other protein containing material.

Albumin is extensively used in the manufacture of food products, as, for example, in the manufacture of nougat centers for candy. Its primary source is found in hen eggs or duck eggs, and the like.

Albumin is one of the simplest of the protein substances, differing from the more complex proteins in the linking of the carbon atoms. I have found it possible to prepare an albumin-like substance from a protein material consisting of substantially oil-free soya bean flour by means of the process hereinafter described. Heretofore, protein material similar to that which I use in my process has been treated with acid, under pressure. This is done commercially, and the albumin-like substance thus prepared can be used to a limited extent in the same way as albumin which is derived from eggs.

One of the objects of my invention is to provide a new and improved process for preparing an albumin-like substance which resembles albumin derived from eggs in many of its properties and which has in addition certain other desirable properties.

Other objects and advantages of the invention will appear hereinafter.

I have found that proteolytic enzymes can accomplish the result desired. I prefer to utilize what is sometimes referred to as "yeast endotryptase," although it will be apparent that other proteolytic enzymes might be used but with less satisfactory results.

Enzyme preparation itself is an old art. However, I have found that in order to obtain endotryptase in quantities sufficient for commercial use, certain obstacles must be overcome. Of all the compounds which are rich in this enzyme, I have found ordinary baker's yeast to be the most satisfactory for commercial purposes. However, the enzymes zymase and invertase are also present in baker's yeast and they must be separated and destroyed in order that my process can be successfully carried out.

In the process of separating the zymase and invertase from the endotryptase and then destroying the first two enzymes mentioned and removing the last enzyme, I have departed from the generally accepted methods of enzyme preparation in two respects. I use ammonium nitrate to separate and destroy invertase, and I use suspended calcium phosphate in conjunction with colloidal calcium phosphate to make possible the complete removal of endotryptase. I shall explain these features more in detail hereinafter.

This process of enzyme preparation consists of autolysis of certain compounds which are rich in these enzymes, followed by the separating of them from other accompanying products which may be deleterious to the success of their application.

As an example, the product which I prefer, ordinary baker's yeast, preferably free from starch, can be utilized to prepare these enzymes in the following described manner. One pound of yeast is mixed with one pound of water, free from mineral matter, in a stone receptacle such as a stone jar. This receptacle is equipped with a mechanical stirring device capable of keeping the mass in agitation, and which device is made of such material that dilute acid will not attack it.

In this mass is placed hydrochloric acid until the hydrogen ion concentration is adjusted to a pH of from 2.25 to 5.00, preferably 2.8. A variable amount of acid is used because the acidity of the yeast, from age, is a factor in obtaining such a pH. About 1 cc. to 25 cc. may be used, although 20 cc. of concentrated acid will be required generally where the yeast is one week old. It is recognized that a pH other than 2.8 may be used, although the time of final reaction will vary accordingly.

Agitation of this mass is started at a speed of about 60 R. P. M. and the batch is maintained at a temperature of from 70° F. to 128° F., although 100° F. is preferred. In about sixteen hours the mass becomes clear and the digestion is complete. The solution at this point contains some invertase, zymase, and endotryptase. Since zymase is itself a protein, the solution is allowed to stand for twenty-four hours, during which time the endotryptase attacks the protein zymase and completely destroys it. After this has been accomplished, I add ten grams of ammonium nitrate and the mixture is again heated to a temperature of from 70° F. to 126° F., preferably 100° F., and is maintained at this temperature for an additional twenty-four hours. During this period, the invertase, and any diatase, lactase, and maltase present, are destroyed. This particular feature of my process, the separation and destruction of invertase by ammonium nitrate, is new and is included as a part of my invention.

Enzymes are catalyzers and as such can be recatalyzed and their activity greatly increased.

I do this by treating the solution with colloidal calcium phosphate (tribasic). The quantity to be added is about five grams. Since colloidal calcium phosphate is prepared by grinding calcium phosphate with 1% gelatine in water, only about 40% is ever rendered colloidal, the balance remaining as a suspended material which will rapidly settle out from the clear solution. Since the five gram amount is computed on a dry basis, it is necessary to dry a sample of the prepared phosphate and determine its solid material. From this may be determined the total amount needed to obtain the required five grams. The suspended phosphate is necessary in conjunction with the colloidal phosphate because the enzyme, endotryptase will attach itself to the particles and the complete removal of the enzyme is thus effected.

I next transfer the precipitated enzyme on the calcium phosphate to a glycerine solution, preferably 20% concentration, and shake well. This will dislodge the enzyme and will transfer it in soluble form to the glycerine solution, and with it as an accompanying ingredient will be the larger part of the colloidal calcium phosphate, but not the suspended phosphate.

The enzyme suspension or solution can be standardized as to strength by testing its power for producing the albumin-like substance from the starting material. This is done by determining the exact amount of complex protein material used, by precipitating the albumin-like substance by alcohol, drying and weighing it, followed by a computation of the amount of albumin-like substance produced from a unit amount of enzyme solution used with a definite amount of soya bean material.

In general, the amount of enzyme from one pound of yeast will be found to be approximately 44,000 units. If this figure, 44,000, is divided by 453 (number of grams in one pound), it will be seen that the enzyme so prepared from one pound of yeast will be needed to produce about 100 pounds of albumin-like substance. The enzyme so prepared will keep in 20% glycerine solution for a period of from six to eight months without changing its strength materially.

I prefer to use soya beans in the practice of my invention, although it must be recognized that many other vegetable substances are also high in protein content and might be used. In order to be utilized in the manufacture of an albumin-like substance, soya beans must be prepared by a suitable preliminary process.

In the first place, select beans must be used. They must be free from mold and from a musty taste, because either of these factors will be conveyed easily to the finished product, making it unfit for food purposes.

Secondly, the beans must be ground partially and the oil must be removed. The more completely this is done the better the albumin-like substance will be, especially where it is to be used for whipping purposes. The oil content of the soya bean meal should not exceed 1%. I prefer an oil content of .5% or less.

In the third place, the dried soya meal must be ground to a flour. I prefer to use a flour that is at least 80 mesh in standard of fineness. If coarser material is used, the process of conversion will be delayed so as to cause trouble from spoilage and the albumin-like substance will decompose before it has been completely converted. I prefer to sift all the flour through an 80 mesh sieve in order to be sure of maximum size grain. Usually a large amount of the flour is much finer than 80 mesh.

Soya bean flour which is prepared according to the specifications I have outlined above, will have a protein content of aproximately 50% to 52%. The larger part of the remainder of the flour, about 35% to 48%, will consist of crude fiber and carbohydrates. I prefer to use a flour that has a very low fiber content and which is free from all visible hulls.

The next step in my process consists of mixing the flour with water until a moisture content of 1/2% to 40%, preferably 15%, is reached. This is still an apparently dry flour, but it is important to keep it as dry as possible and yet sufficiently moist to make possible the enzyme reaction hereinafter described.

I next adjust the mass to a pH of from 6.5 to 6.9, preferably 6.8, and then place it in a vessel equipped with a slow agitator having a speed of about 40 R. P. M. This vessel must not be made of iron or contain a deleterious amount of iron or iron erodable material. I have found that a vessel made of Monel metal or tin is satisfactory. A glass container may also be used. Stoneware is not recommended because it will give up enough iron to be detrimental to the process.

The next step in my process consists of adding a quantity of enzyme solution sufficient, according to the standardization I have outlined heretofore, to convert completely the amount of protein present to an albumin-like substance. The mass is then agitated for from six to eight hours at a temperature of from 80° F. to 130° F., preferably 90° F., when all the protein should be converted to its albumin-like form. This can be tested by dissolving a sample in water, filtering, and precipitating the albumin-like substance by alcohol and by observing the percentage produced from the protein present. When this conversion is 98% accomplished, the mass is digested with a large amount of water and dissolved therein. All of the insoluble matter is removed. It must be understood that the conversion by my process may be carried to 100% completion rather than 98%, but a risk of spoilage will then arise which makes this degree of conversion inadvisable.

My next step consists of precipitating the colloidal solution of albumin-like substance by means of an electric current, preferably of 26 volts and four amperes, using one carbon electrode and one platinum wire electrode. By using a large number of poles on the platinum electrode, I am enabled to dispel into the solution a large quantity of electrons within a limited time. Immediately before using the electric current, I add to the solution about 2% of ordinary salt to accelerate the electrolysis. Any other similar electrolyte may be used. The process of precipitation is completed within approximately twelve minutes, after which time the albumin-like substance is removed, dried and ground. The product is then ready for commercial use. From two pounds of fat-free soya flour, it is ordinarily possible to obtain one pound of albumin-like substance by my process.

Other modes of applying the principles of my invention may be followed, change being made in the details described, provided the features stated in the following claims, or the equivalent of such, be employed.

I, therefore, particularly point out and distinctly claim as my invention:

1. A process of preparing an albumin-like substance which comprises subjecting substantially oil-free soya bean flour to the action of the enzyme endotryptase, and precipitating the albumin-like substance by passing an electric current through the solution.

2. A process of preparing an albumin-like substance which comprises subjecting substantially oil-free soya bean flour to the action of the enzyme endotryptase, dissolving the mass in water, removing undissolved matter, and precipitating the albumin-like substance by passing an electric current through the solution.

3. A process of preparing an albumin-like substance which comprises subjecting substantially oil-free soya bean flour to the action of the enzyme endotryptase, agitating the mass at a temperature of substantially 80° F. to 130° F., dissolving the mass in water, removing undissolved matter, and precipitating the albumin-like substance by passing an electric current through the solution.

4. A process of preparing an albumin-like substance which comprises subjecting substantially oil-free soya bean flour to the action of the enzyme endotryptase, agitating the mass for from six to eight hours at a temperature of substantially 80° F. to 130° F., dissolving the mass in water, removing undissolved matter, and precipitating the albumin-like substance by passing an electric current through the solution.

5. A process of preparing an albumin-like substance which comprises subjecting substantially oil-free soya bean flour to the action of the enzyme endotryptase, agitating the mass for from six to eight hours at a temperature of substantially 80° F. to 130° F., dissolving the mass in water, adding an electrolyte to the solution, and precipitating the albumin-like substance by passing an electric current through the solution.

6. A process of preparing an albumin-like substance which comprises subjecting substantially oil-free soya bean flour, of at least 80 mesh fineness, to the action of the enzyme endotryptase, agitating the mass for from six to eight hours at a temperature of from 80° F. to 130° F., dissolving the mass in water, removing undissolved matter, and precipitating the alumin-like substance by passing an electric current through the solution.

7. A process of preparing an albumin-like substance which comprises subjecting soya bean flour, of 1% or less oil content, to the action of the enzyme endotryptase, agitating the mass for from six to eight hours, at a temperature of from 80° F. to 130° F., dissolving the mass in water, removing undissolved matter, and precipitating the albumin-like substance by passing an electric current through the solution.

8. A process of preparing an albumin-like substance which comprises subjecting soya bean flour, of 1% or less oil content and of at least 80 mesh fineness, to the action of the enzyme endotryptase, agitating the mass for from six to eight hours at a temperature of from 80° F. to 130° F., dissolving the mass in water, removing undissolved matter, and precipitating the albumin-like substance by passing an electric current through the solution.

9. A process of preparing an albumin-like substance from substantially oil-free soya bean flour, comprising the separation of endotryptase from yeast whereby zymase is destroyed by the endotryptase and invertase is separated and destroyed by ammonium nitrate, treating the solution with colloidal and suspended calcium phosphate, transferring the precipitated enzyme to glycerine solution, dislodging the enzyme from the calcium phosphate by agitation, subjecting the soya bean flour to the action of the enzyme endotryptase, agitating the mass for from six to eight hours at a temperature of substantially 80° F. to 130° F., dissolving the mass in water, removing undissolved matter, and precipitating the albumin-like substance by passing an electric current through the solution.

10. A process of preparing an albumin-like substance substantially oil-free from soya bean flour, comprising the separation of endotryptase from yeast whereby zymase is destroyed by the endotryptase and invertase is separated and destroyed by ammonium nitrate, activating the separated endotryptase by means of colloidal calcium phosphate, subjecting the soya bean flour to the action of the endotryptase, and precipitating the albumin-like substance by passing an electric current through the solution.

11. A process of preparing an albumin-like substance from soya bean flour of 1% or less oil content, of at least 80 mesh fineness, which comprises mixing said flour with sufficient water to provide a moisture content of ½% to 40%, adjusting the mass to a pH of 6.5 to 6.9, agitating the mass at 40 R. P. M. in a container free from iron or iron erodable material, adding activated endotryptase, agitating the mass for from six to eight hours at a temperature of from 80° F. to 130° F., dissolving the mass in water, removing insoluble matter, adding an electrolyte to the solution, precipitating the albumin-like substance by passing an electric current through the solution, removing and drying the precipitated albumin.

12. A method of preparing an albumin-like substance from substantially oil-free soya bean flour, which comprises mixing the flour with water sufficient to provide a moisture content of ½% to 40%, and subjecting the mass to the action of activated endotryptase for from 6 to 8 hours at a temperature of from about 80° F. to about 130° F.

13. A method of preparing an albumin-like substance from substantially oil-free sayo bean flour, which comprises mixing the flour with water sufficient to provide a moisture content of ½% to 40%, subjecting the mass to the action of activated endotryptase for from 6 to 8 hours at a temperature of from 80° F. to 130° F., and precipitating the albumin-like substance by passing an electric current through a solution.

14. A method of preparing an albumin-like substance from substantially oil-free soya bean flour, which comprises mixing the soya flour with water sufficient to provide a moisture content of ½% to 40%, adjusting the mass to a pH of 6.5 to 6.9, agitating the mass at substantially 40 R. P. M., subjecting the mass to the action of activated endotryptase, for from 6 to 8 hours at a temperature of from about 80° F. to about 130° F. and precipitating the albumin-like substance by passing an electric current through the solution.

15. A method of preparing an albumin-like substance from substantially oil-free soya bean flour, which comprises mixing the soya flour with water sufficient to provide a moisture content of 1/2% to 40%, adjusting the mass to a pH of 6.5 to 6.9, agitating the mass, separating and removing endotryptase from yeast whereby zymase is destroyed by the endotryptase and invertase is separated and destroyed by ammonium nitrate, activating the separated enzyme endotryptase by means of colloidal calcium phosphate, adding the activated enzyme to the soya flour, agitating the mass for from six to eight hours at a temperature of substantially 80° F. to 130° F., dissolving the mass in water, removing insoluble matter, and precipitating the albumin-like substance by passing an electric current through the solution.

16. In a process of preparing an albumin-like substance from soya beans, the step which comprises treating substantially oil-free soya bean flour which has been digested in water with an enzyme consisting substantially of the enzyme endotryptase.

17. In a process of preparing an albumin-like substance by the reaction of a proteolytic enzyme on substantially oil-free soya bean flour, the step which comprises separating the enzyme endotryptase from yeast by digesting the yeast under acid conditions and then treating the acid mixture with ammonium nitrate.

18. In a process of preparing an albumin-like substance from substantially oil-free soya bean flour having a moisture content of from about 1/2% to 40%, the step which comprises adjusting the mass to a pH of substantially 6.5 to 6.9, and subjecting the mass to the action of activated endotryptase.

EARL H. CUMMINS.